US 9,864,657 B2

(12) United States Patent
Hu

(10) Patent No.: US 9,864,657 B2
(45) Date of Patent: Jan. 9, 2018

(54) METHOD AND APPARATUS OF AUTOMATICALLY BACKING UP APPLICATION DATA AND PERFORMING RESTORATION AS REQUIRED

(71) Applicant: ZTE CORPORATION, Shenzhen, Guangdong Province (CN)

(72) Inventor: Bo Hu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/035,630

(22) PCT Filed: Apr. 18, 2014

(86) PCT No.: PCT/CN2014/075713
§ 371 (c)(1),
(2) Date: Jun. 9, 2016

(87) PCT Pub. No.: WO2014/183534
PCT Pub. Date: Nov. 20, 2014

(65) Prior Publication Data
US 2016/0292042 A1    Oct. 6, 2016

(30) Foreign Application Priority Data
Nov. 12, 2013  (CN) .......................... 2013 1 0560598

(51) Int. Cl.
*G06F 7/00*       (2006.01)
*G06F 17/00*      (2006.01)
*G06F 11/14*      (2006.01)

(52) U.S. Cl.
CPC ...... *G06F 11/1451* (2013.01); *G06F 11/1458* (2013.01); *G06F 11/1469* (2013.01); *G06F 2201/805* (2013.01); *G06F 2201/84* (2013.01)

(58) Field of Classification Search
CPC ............. G06F 11/1451; G06F 11/1469; G06F 2201/805; G06F 2201/84
(Continued)

(56) References Cited

U.S. PATENT DOCUMENTS 6,701,454 B1 *   3/2004   Fischer ............... G06F 11/1415
                                                          714/15
2002/0059090 A1 *  5/2002   Yanagimachi ......... G06Q 10/10
                                                          705/320
(Continued)

FOREIGN PATENT DOCUMENTS

CN     101751287 A    6/2010
CN     102591727 A    7/2012
(Continued)

OTHER PUBLICATIONS

"Automatically Save and Recover Files".*
(Continued)

*Primary Examiner* — Binh V Ho
(74) *Attorney, Agent, or Firm* — Plumsea Law Group, LLC

(57) ABSTRACT

A method and apparatus for automatically backing up application data and performing restoration as required are disclosed in the embodiments of the present document, which relates to application data backup and restoration technology of a terminal system. The method includes: an application layer setting an application data directory of an application into a system constant according to a backup instruction; a bottom layer acquiring a directory permission of the application data directory through the application data directory in the system constant; the bottom layer setting a permission of the application data directory to read-write; and the application layer backing up the application data under the application data directory of which the permission has been
(Continued)

set to read-write, to perform restoration as required by using a backed-up application data hereafter.

19 Claims, 4 Drawing Sheets

(58) Field of Classification Search
 USPC .......................................................... 707/653
 See application file for complete search history.

(56) References Cited

U.S. PATENT DOCUMENTS

| | | | |
|---|---|---|---|
| 2005/0091310 A1* | 4/2005 | Salomon | G06F 9/5077 709/203 |
| 2008/0133622 A1* | 6/2008 | Brown | G06F 11/1458 |
| 2009/0177856 A1 | 7/2009 | Herne | |
| 2013/0179403 A1* | 7/2013 | Kim | G06F 11/1458 707/654 |
| 2014/0149701 A1 | 5/2014 | Osada et al. | |

FOREIGN PATENT DOCUMENTS

| | | |
|---|---|---|
| CN | 102981835 A | 3/2013 |
| CN | 103200306 A | 7/2013 |
| EP | 2613259 A1 | 7/2013 |
| EP | 2613260 A2 | 7/2013 |
| WO | 2013030967 A1 | 7/2013 |
| WO | 2014183534 A1 | 11/2014 |

OTHER PUBLICATIONS

International Search Report dated Aug. 5, 2014 in PCT Patent Application No. PCT/CN2014/075713.
Written Opinion dated Aug. 5, 2014 in PCT Patent Application No. PCT/CN2014/075713.
European Search Report dated Nov. 25, 2016 for EP Application No. 14797769.8.

* cited by examiner

METHOD AND APPARATUS OF AUTOMATICALLY BACKING UP APPLICATION DATA AND PERFORMING RESTORATION AS REQUIRED

CROSS-REFERENCE TO RELATED APPLICATION(S)

This application is the U.S. National Phase application of PCT application number PCT/CN2014/075713 having a PCT filing date of Apr. 18, 2014, which claims priority of Chinese patent application 201310560598.5 filed on Nov. 12, 2013, the disclosures of which are hereby incorporated by reference.

TECHNICAL FIELD

The present document relates to application data backup and restoration technology of a terminal system, and particularly, to a method and related apparatus for automatically backing up application data and performing restoration as required by a terminal.

BACKGROUND OF RELATED ART

Nowadays, mobile games are quite prevailing, and a great many games have an automatic save mechanism, thus the players cannot play the games through the Save/Load way.

Since the application data directory must be accessed only by a root user namely a user with the highest authority, general applications and even system services cannot be modified, thus it causes that many users have to try rooting the mobile phone to back up the data, while this also brings a great inconvenience.

SUMMARY

The object of the embodiments of the present document is to provide a method and apparatus for automatically backing up application data and performing restoration as required, which can better solve the problem of automatically backing up the application data and performing restoration as required.

According to one aspect of the embodiment of the present document, a method for automatically backing up application data and performing restoration as required is provided, which comprises:

an application layer setting an application data directory of an application into a system constant according to a backup instruction;

a bottom layer acquiring a directory permission of the application data directory by using the application data directory in the system constant;

the bottom layer setting a permission of the application data directory to read-write; and the application layer backing up the application data under the application data directory of which the permission has been set to read-write, to perform restoration as required by using the backed-up application data hereafter.

Preferably, the backup instruction is generated according to a running state of the application, which specifically comprises:

detecting the running state of the application;

when detecting that the application is closed, generating the backup instruction.

Preferably, the method further comprises:

after acquiring the directory permission of the application data directory, backing up the application data directory and the directory permission to a backed-up list;

after backing up the application data directory and the directory permission to the backed-up list, clearing the system constant.

Preferably, the step of the application layer backing up application data under the application data directory of which the permission has been set to read-write comprises:

the application layer comparing the application data under the application data directory of which the permission has been set to read-write with application data backed up previously, and obtaining difference part application data under the application data directory;

the application layer backing up the difference part application data, and recording a backup time point of the difference part application data for a user to restore the application data as required by using the backup time point.

Preferably, the method further comprises: after the step of the application layer backing up application data under the application data directory of which the permission has been set to read-write is completed, performing a step of restoring the directory permission of the application data directory by using the directory permission backed up in the backed-up list.

Preferably, the step of restoring the directory permission of the application data directory comprises:

the application layer setting the application data directory into a system constant again;

the bottom layer finding the application data directory by scanning the system constant, and checking whether the found application data directory has existed in the backed-up list;

if the found application data directory has existed in the backed-up list, restoring the read-write permission of the application data directory to the directory permission backed up in the backed-up list; and after restoring the read-write permission of the application data directory to the directory permission backed up in the backed-up list, clearing the system constant.

Preferably, the step of performing restoration as required by using the backed-up application data comprises:

according to a restoration instruction, the application layer forcibly closing the application, and in accordance with a backup time point selected by the user, reading all application data backed up before the backup time point, and copying all the application data to the application data directory of which the permission has been set to read-write.

According to another aspect of the present document, an apparatus for automatically backing up application data and performing restoration as required is provided, which comprises:

an application layer setting module, configured to set an application data directory of an application into a system constant according to a backup instruction;

a bottom layer permission acquisition module, configured to acquire a directory permission of the application data directory by using the application data directory in the system constant;

a bottom layer permission modification module, configured to set a permission of the application data directory to read-write; and an application layer data backup module, configured to back up the application data under the application data directory of which the permission has been set to read-write, to perform restoration as required by using the backed-up application data hereafter.

Preferably, the application layer data backup module comprises:

a difference data acquisition submodule, configured to compare the application data under the application data directory of which the permission has been set to read-write with application data backed up previously, and obtain difference part application data under the application data directory;

a data backup submodule, configured to back up the difference part application data, and record a backup time point of the difference part application data for a user to restore the application data as required by using the backup time point.

Preferably, the apparatus further comprises:

an application layer data restoration module, configured to according to a restoration instruction, forcibly close the application, and in accordance with a backup time point selected by the user, read all application data backed up before the backup time point, and copy all the application data to the application data directory of which the permission has been set to read-write.

Compared with the related art, the beneficial effects of the embodiments of the present document lie in that:

in the embodiments of the present document, it is to modify the directory permission of the application data directory, automatically back up the application data, and enable the user to restore the application data according to the recorded backup time point, which greatly improves the user experience.

PREFERRED EMBODIMENTS

The preferred embodiments of the present document are described in detail in combination with the accompanying drawings below. The preferred embodiments described below are only used to describe and explain the present document, and not used to limit the present document.

Figure 1:
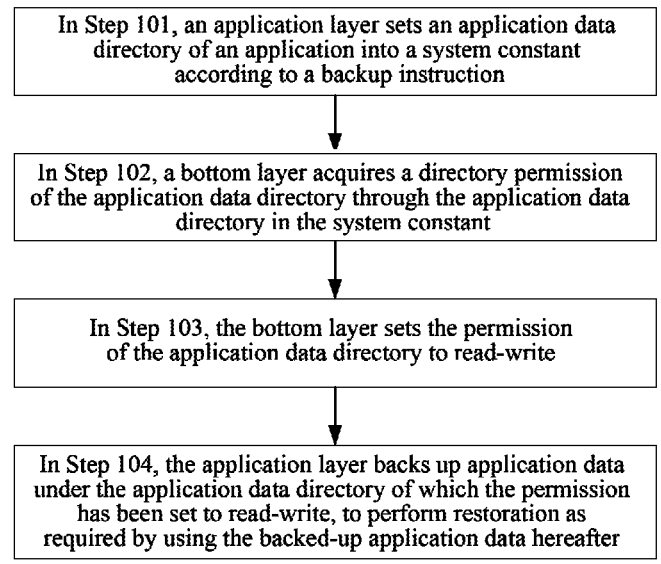
FIG. 1 is a block diagram of a principle of a method for automatically backing up application data and performing restoration as required provided in the embodiment of the present document.

FIG. 1 is a block diagram of a principle of a method for automatically backing up application data and performing restoration as required provided in the embodiment of the present document, and as shown in FIG. 1, the steps include:

In step 101, an application layer sets an application data directory of an application into a system constant according to a backup instruction.

The backup instruction is generated according to a running state of the application, which specifically includes: the running state of the application is detected; and when cases, such as the user exits the application or the application is killed by the system or the like, occur, it would be detected that the application is closed, at this point, the backup instruction is generated.

The system constant is an area that may be read and written by both the bottom layer and the application layer in the system, and the system constant is usually used for information interaction between the upper layer and the bottom layer.

In step 102, the bottom layer acquires a directory permission of the application data directory through the application data directory in the system constant.

The step 102 includes: the bottom layer scans the system constant at regular time, once it is found that the system constant is not null, the content of the system constant is read, the read content is the application data directory set into the system constant by the application layer; and then through an interface provided by the system, the bottom layer acquires the directory permission of the application data directory.

Preferably, after acquiring the directory permission of the application data directory, the bottom layer backs up the application data directory and the directory permission to a backed-up list, and clears the system constant.

In step 103, the bottom layer sets the permission of the application data directory to read-write.

The bottom layer performs permission setting on the application data directory through the interface provided by the system.

In general, only a root user may use the interface provided by the system to perform permission setting on all application data directories, and the rest users would be failed while setting due to no permission. The bottom layer has the permission of the root user in the embodiment, and performs permission setting on the directory permission of the application data directory acquired by scanning at regular time.

In step 104, the application layer backs up application data under the application data directory of which the permission has been set to read-write, to perform restoration as required by using the backed-up application data hereafter.

The step 104 includes: the application layer compares the application data under the application data directory of which the permission has been set to read-write with the application data backed up previously, and obtains difference part application data under the application data directory, then backs up the difference part application data, and records a backup time point of the difference part application data for a user to restore the application data as required by using the backup time point.

Preferably, after the backup is completed, the directory permission of the application data directory is restored by using the directory permission backed up in the backed-up list, the application layer sets the application data directory into a system constant again, then the bottom layer finds the application data directory by scanning the system constant, and checks whether the found application data directory has existed in the backed-up list, if the found application data directory has existed in the backed-up list, a read-write permission of the application data directory is restored to the directory permission backed up in the backed-up list, and then the system constant is cleared.

When the user needs to perform data restoration, the restoration as required may be performed by using the backed-up application data. Firstly, the application layer sets an application data directory of an application into a system constant according to a restoration instruction. Secondly, the bottom layer finds the application data directory by scanning the system constant, and through the interface provided by the system, finds a directory permission of the application data directory, and then saves the application data directory and the directory permission into the backed-up list, and clears the system constant. Then, the application layer forcibly closes the application, and in accordance with the backup time point previously selected by the user, reads all application data backed up before the backup time point, and copies all the application data to the application data directory of which the permission has been set to read-write. At last, the application layer sets the application data directory into the system constant again, the bottom layer finds the application data directory by scanning the system constant, and checks whether the found application data directory has existed in the backed-up list, if the found application data directory has existed in the backed-up list, restores a read-write permission of the application data directory to the directory permission backed up in the backed-up list, and then clears the system constant.

Figure 2:
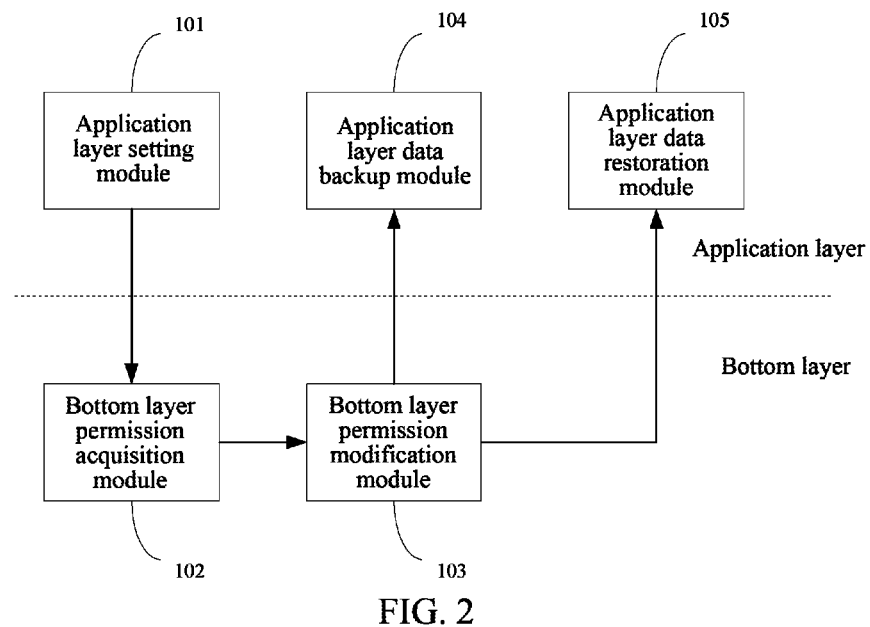
FIG. 2 is a block diagram of a structure of an apparatus for automatically backing up application data and performing restoration as required provided in the embodiment of the present document.

FIG. 2 is a block diagram of a structure of an apparatus for automatically backing up application data and performing restoration as required provided in the embodiment of the present document, and as shown in FIG. 2, the apparatus includes an application layer setting module 101, a bottom layer permission acquisition module 102, a bottom layer permission modification module 103, an application layer data backup module 104 and an application layer data restoration module 105.

When automatically backing up the application data, the application layer setting module 101 is configured to set an application data directory of an application into a system constant according to a backup instruction, wherein, the backup instruction is generated according to a running state of the application, which includes: the running state of the application is detected, and when cases, such as the user quits the application or the application is killed by the system or the like, occur, it would be detected that the application is closed, the backup instruction at this point is generated. The bottom layer permission acquisition module 102 is configured to acquire a directory permission of the application data directory through the application data directory in the system constant, the bottom layer permission acquisition module 102 is further configured to scan the system constant at regular time, once it is found that the system constant is not null, read the content of the system constant, wherein the read content is the application data directory set into the system constant by the application layer setting module 101; and then through an interface provided by the system, acquire the directory permission of the application data directory, preferably, after acquiring the directory permission of the application data directory, back up the application data directory and the directory permission to a backed-up list, and clear the system constant. The bottom layer permission modification module 103 is configured to set a permission of the application data directory to read-write. The application layer data backup module 104 is configured to back up application data under the application data directory of which the permission has been set to read-write, to perform restoration as required by using the backed-up application data, wherein, the application layer data backup module 104 includes a difference data acquisition submodule and a data backup submodule, the difference data acquisition submodule compares the application data under the application data directory of which the permission has been set to read-write with application data backed up previously, and obtains difference part application data under the application data directory, the data backup submodule is configured to back up the difference part application data, and record a backup time point of the difference part application data for a user to restore the application data as required by using the backup time point. Preferably, after the application data backup is completed, the step of restoring the directory permission of the application data directory by using the directory permission backed up in the backed-up list includes: the application layer setting module 101 sets the application data directory into the system constant again, the bottom layer permission acquisition module 102 finds the application data directory by scanning the system constant, and checks whether the found application data directory has existed in the backed-up list, if the found application data directory has existed in the backed-up list, the bottom layer permission acquisition module 102 restores a read-write permission of the application data directory to the directory permission backed up in the backed-up list, and clears the system constant.

When restoring the application data as required, the application layer setting module 101 is configured to set the application data directory of the application into the system constant according to a restoration instruction. The bottom layer permission acquisition module 102 is configured to acquire the directory permission of the application data directory through the application data directory in the system constant, the bottom layer permission acquisition module 102 scans the system constant at regular time, once it is found that the system constant is not null, reads the content of the system constant, wherein the read content is the application data directory set into the system constant by the application layer setting module 101; and then through an interface provided by the system, the bottom layer permission acquisition module 102 acquires the directory permission of the application data directory, preferably, after acquiring the directory permission of the application data directory, it backs up the application data directory and the directory permission to a backed-up list, and clears the system constant. The bottom layer permission modification module 103 is configured to set the permission of the application data directory to read-write. The application layer data restoration module is configured to forcibly close the application, and in accordance with the backup time point selected by the user, read all application data backed up before the backup time point, and copy all the application data to the application data directory of which the permission has been set to read-write. Preferably, after the restoration as required for the application data is completed, the step of restoring the directory permission of the application data directory by using the directory permission backed up in the backed-up list includes: the application layer setting module 101 sets the application data directory into the system constant again, the bottom layer permission acquisition module 102 finds the application data directory by scanning the system constant, and checks whether the found application data directory has existed in the backed-up list, if the found application data directory has existed in the backed-up list, the bottom layer permission acquisition module 102 restores the read-write permission of the application data directory to the directory permission backed up in the backed-up list, and clears the system constant.

The above method and apparatus for automatically backing up the application data and performing restoration as required are applied in a terminal, the terminal may be a mobile phone or another type of a terminal such as a tablet computer and so on, the present document would be further explained by taking the mobile phone with the Android system as an example below.

The bottom layer: the Android system is taken as an example, and other operating systems are similar. The bottom layer plays a role of a service with the root permission by configuring an initiation file init.rc, the responsibility of the bottom layer is to query a system constant at regular time (the query interval is very short, such as 2 s), once it is found that the content of the system constant is not null, the content of the system constant (namely the application data directory) is read. The directory permission of the application data directory is acquired. If the application data directory is not in the backed-up list, the application data directory and the directory permission are backed up to the backed-up list, and then the directory permission of the application data directory is changed to a read-write permission with which all users can access. If the application data directory is in the backed-up list, the directory permission of the application data directory is restored to the directory permission backed up previously, that is, it is restored to the original permission of the application data directory, and the application data directory is removed from the backed-up list. After the directory permission modification is completed, it is required to clear the system constant for the upper application to set the system constant next time. In addition, when the service starts, it is required to examine the local backup file (i.e. the backed-up file), if content is found, it is required to restore the directory permission of the corresponding application data directory, and that is for solving the case of occurrence of restart in the process of the system backing up/restoring the application data.

The application layer: when the upper layer is required to back up/restore the application data, firstly the corresponding application is forcibly closed, to avoid data collision and error. After notifying the bottom layer by setting the system constant, the application layer constantly judges the directory permission, and once the directory permission is changed to an accessible state (that is, a read-write permission with which all users can access), performs the operation of backing up/restoring the application data, after the operation is completed, the system constant is set again to notify the bottom layer to restore the original directory permission.

The logic of backup: once the user activates an automatic backup function of an application, the apparatus of the embodiment of the present document would monitor the switching of the application interface (record a login and logout of the application interface) and whether the application is killed by the system. Once it is found that the application has been initiated and all related interfaces are exited, or found that the application is killed by the system, a backup process would be started, the application data are automatically backed up and recorded together with the present backup time point, it should be noted that the backup process would not be triggered when the application is initiatively terminated. The difference between the content in the application data directory and the content backed up last time would be compared when backing up, only the difference part is backed up, which ensures that the space occupation is minimum. If there is no difference, the backup record of this time would not be generated. Certainly the user also can actively initiate the backup process, and the apparatus would directly back up the application data at this moment.

The logic of restoration: once the user chooses to restore the application data of the application, the apparatus would list all backed-up backup time points for the user to select, once the user selects a restored backup time point, firstly the system would forcibly terminate the application (an initiative termination would not trigger the backup process), then the backed-up contents are in turn copied to the application data directory from the backup time point of the first backup to the backup time point selected by the user.

The system constant is an area that can be read and written by both the application layer and the bottom layer in the Android system, and the system constant is usually used for information interaction between the upper layer and the bottom layer.

The embodiments of the present document would be further described in combination with FIG. 3 to FIG. 5 below.

Figure 3:
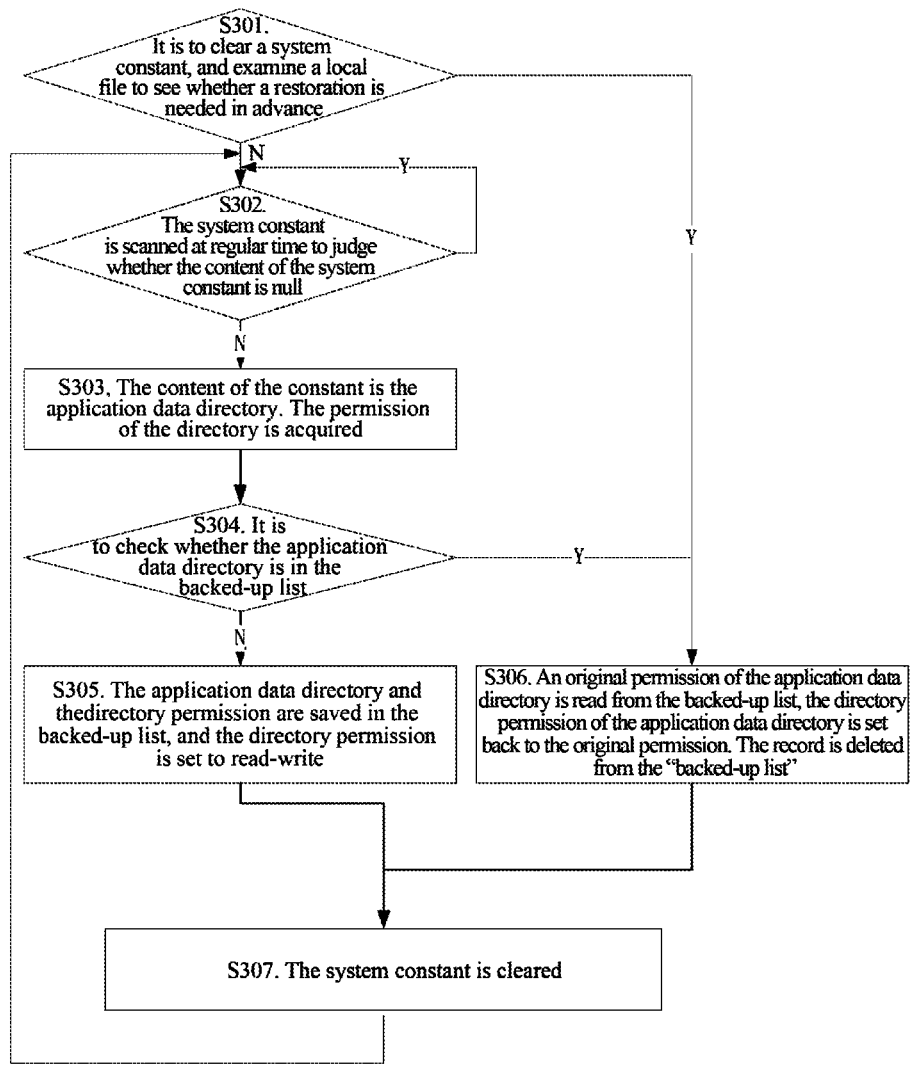
FIG. 3 is a flow chart of the bottom layer starting provided in the embodiment of the present document.

FIG. 3 is a flow chart of starting the bottom layer provided in the embodiment of the present document, and as shown in FIG. 3, the steps include:

In step 301, the bottom layer clears a system constant, examines the local file (i.e. the backed-up list) to see whether there is a residual application data directory of which the directory permission needs to be restored in advance, if there is the residual application data directory, it is to proceed to step S306 to start the directory permission restoration, and otherwise it is to proceed to step S302.

In step S302, the bottom layer scans the system constant at regular time (the original system would not initiatively scan the system constant), judges whether the content of the system constant is null, once it is found that the content of the system constant is not null, it is to proceed to step S303, and otherwise the bottom layer repeatedly scans the system constant.

In step S303, the content of the system constant is the application data directory, and the directory permission of the application data directory is acquired through an interface provided by the system.

In step S304, the bottom layer judges whether the application data directory is in the backed-up list, if the application data directory is not in the backed-up list, it is to proceed to the setting process of step S305, and if the application data directory is in the backed-up list, it is to proceed to the directory permission restoration process of step S306.

In step S305, the bottom layer acquires the directory permission of the application data directory, saves the application data directory and the directory permission in the backed-up list, sets the directory permission to a read-write permission with which all users can access, and then it is to proceed to step S307.

In step S306, the directory permission of the application data directory (i.e. the original permission) is read from the backed-up list, the directory permission of the application data directory is set to the original permission, and the record is deleted from the backed-up list, and then it is to proceed to step S307.

In step S307, the system constant is cleared, and it is to wait for the upper application to set the value again, and return to step S302.

Figure 4:
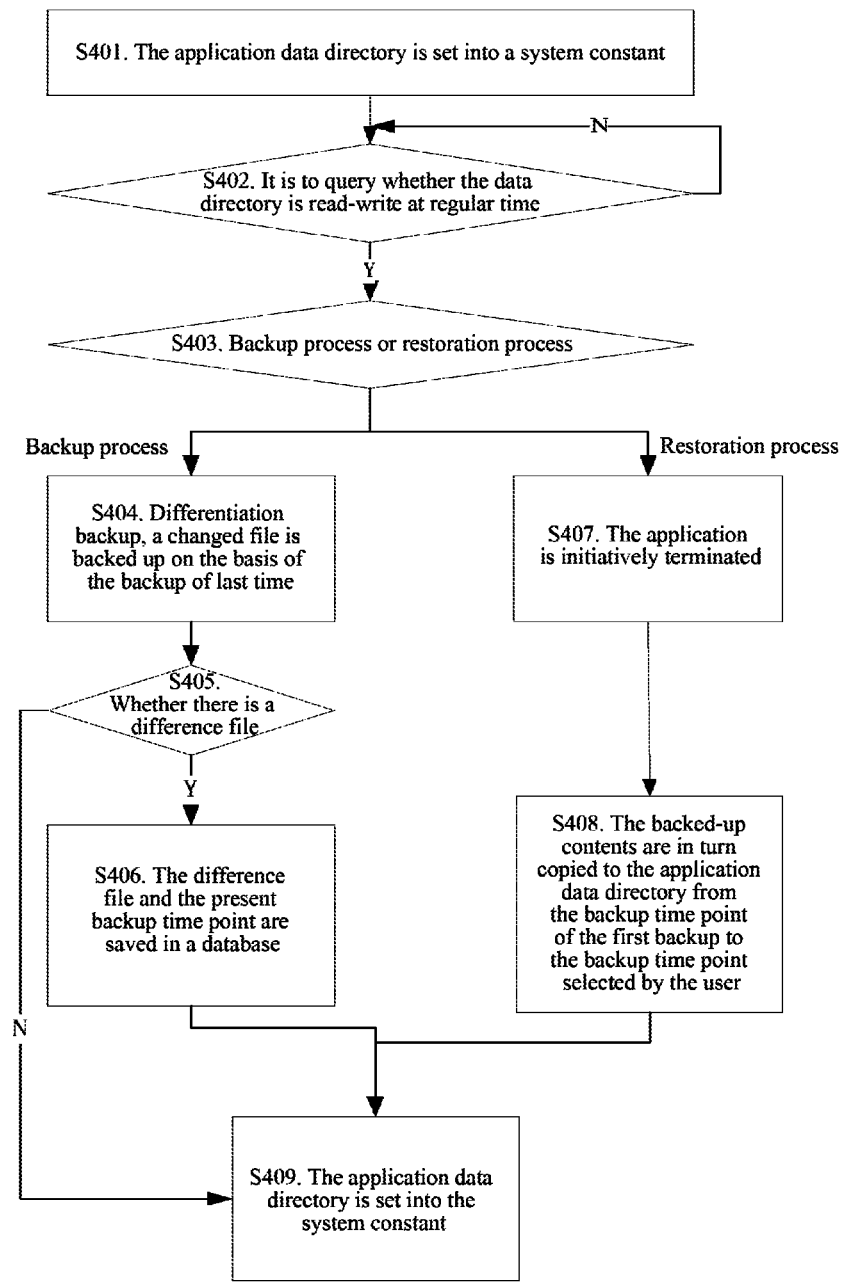
FIG. 4 is a flow chart of the upper layer backing up/restoring application data provided in the embodiment of the present document.

FIG. 4 is a flow chart of the upper layer backing up/restoring application data provided in the embodiment of the present document, and as shown in FIG. 4, the steps include:

In step S401, the application layer sets an application data directory into a system constant.

In step S402, the application layer reads a directory permission of the application data directory at regular time, judges whether the directory permission is read-write, if the directory permission is not read-write, step S402 is repeated to continue waiting, and if the directory permission is read-write, it is to proceed to step S403.

In step S403, the application layer judges whether it is a backup operation or a restoration operation for the application data, and performs the backup or restoration operation for the application data. If it is the backup operation, step S404 to step S406 are executed, and if it is the restoration operation, steps S407-S408 are executed.

In step S404, the application layer performs differentiation backup, that is to say, a changed file is backed up on the basis of the backup of last time.

In step S405, the application layer judges whether there is a difference file, namely difference part application data.

If there is a difference file, it is to proceed to step S406, and if there is no difference file, it is to proceed to step S409.

In step S406, the application layer saves the difference file and the present backup time point in a database, and then it is to proceed to step S409.

In step S407, the application is initiatively terminated.

In step S408, the application layer in turn copies the backed-up contents to the application data directory from the backup time point of the first backup to the backup time point selected by the user, and then it is to proceed to step S409.

In step S409, the application data directory is set into the system constant, and the directory permission of the application data directory is restored by using the directory permission backed up in the backed-up list, and finally the system constant is cleared.

Figure 5:
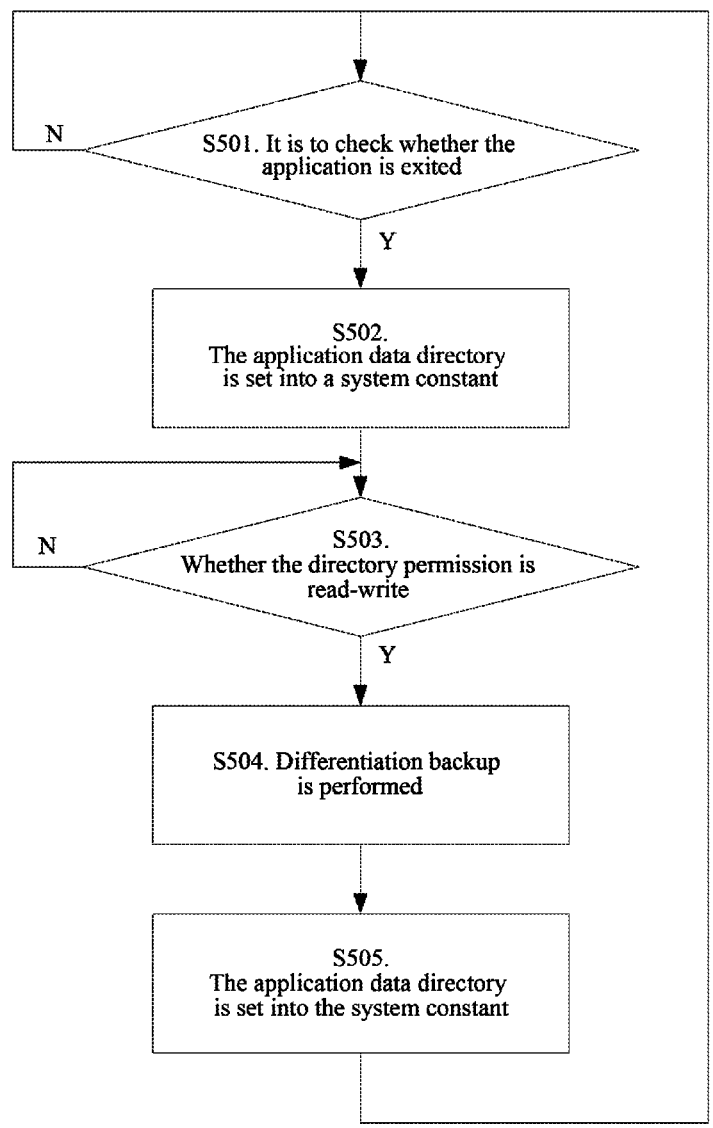
FIG. 5 is a flow chart of automatically backing up the application data provided in the embodiment of the present document.

FIG. 5 is a flow chart of automatically backing up the application data provided in the embodiment of the present document, as shown in FIG. 5, the steps include:

In step S501, a running state of the application is detected.

It is to monitor and record the start and exit situations of the interface to which the application belongs and the survival status of the application (in the Android system, it may acquire whether the application is killed by the system through a way for registering to receive a death report of the application). Once it is found that the application is changed from a starting state (that is, the interface to which the application belongs starts on the basis that there is not any interface of the application) to a closed state (that is, all interfaces of the application are exited), or found that the application is killed by the system, it is to proceed to step S502, otherwise the monitoring is continued.

In step S502, the application data directory is set into a system constant.

In step S503, it is to query a directory permission of the application data directory at regular time, judge whether the directory permission is read-write, if the directory permission is read-write, it is to perform step S504, and if the directory permission is not read-write, it is to continue querying the directory permission of the application data directory at regular time.

In step S504, if it is found that there is a difference file indeed in the backup process, the difference file and the present backup time point are taken as one piece of record to be stored in the database.

In step S505, the application data directory is set into the system constant, and the directory permission of the application data directory is restored by using the directory permission backed up in the backed-up list, finally the system constant is cleared, and step S501 is repeatedly performed.

The embodiment of the present document would be further described by taking the application data backup process of the game A as an example below.

The system starts, the bottom service is started, it is found that there is no record of the directory permission which is not restored last time after examining the backed-up list, and it begins to monitor content of a system constant at regular time.

Since the user has configured to automatically back up the game A, the interface switching and the living situation of the game A would be monitored after the upper layer is started.

The user starts the game A and plays the game for a period of time, and the game application automatically saves the progress during the period. After the game A is exited, an automatic backup process is started. The application layer sets information of an application data directory where the application data of the game A are stored into the system constant, so that the bottom layer acquires a directory permission of the application data directory through the application data directory, and modifies the directory permission to read-write, and preferably, the bottom layer backs up the application data directory and the original directory permission of the application data directory to a backed-up list, and clears the system constant. Then after finding that the directory permission is read-write by querying the directory permission at regular time, the application layer begins to check the difference between the application data and the application data backed up last time of the game A, and if there is a difference, the application layer records the difference part application data. Especially, if it did not continue to back up previously, certainly all the application data are difference data, and certainly as a result, there is a difference. The present backup time point and the difference file content (i.e. the difference part application data) are saved in the database. The information of the application data directory where the application data of the game A are stored is set into the system constant again, so that the bottom layer restores the directory permission of the application data directory by using the directory permission backed up in the backed-up list, and then clears the system constant.

In conclusion, the embodiments of the present document have the following technical effects:

In the embodiments of the present document, the automatic backup and restoration as required for the application data are particularly effective to certain applications (especially to certain games with an automatic save function), which is a highlight function that can surely attract users (especially the game players).

Though the embodiments of the present document are described in detail above, the embodiments of the present document are not limited to this, and the one skilled in the art can make one or more modifications according to the principle of the embodiments of the present document. Therefore, it should be understood that all the modifications made in accordance with the principle of the embodiments of the present document fall into the protection scope of the present document.

INDUSTRIAL APPLICABILITY

In the embodiments of the present document, it is to modify the directory permission of the application data directory, automatically back up the application data, and enable the user to restore the application data according to the recorded backup time point, which greatly improves the user experience.

What is claimed is:

1. A method for automatically backing up application data and performing restoration as required, comprising:

an application layer setting an application data directory of an application into a system constant, which is an area that is able to be read and written by both the application layer and a bottom layer, according to a backup instruction;

the bottom layer acquiring a directory permission of the application data directory by using the application data directory in the system constant;

the bottom layer, which is configured with an initiation file so as to have root permission, setting a permission of the application data directory to read-write; and the application layer backing up the application data under the application data directory of which the permission has been set to read-write, to perform restoration as required by using the backed-up application data hereafter.

2. The method according to claim 1, wherein, the backup instruction is generated according to a running state of the application, which comprises:

detecting the running state of the application;

when detecting that the application is closed, generating the backup instruction.

3. The method according to claim 1, wherein the method further comprises:

after acquiring the directory permission of the application data directory, backing up the application data directory and the directory permission to a backed-up list;

after backing up the application data directory and the directory permission to the backed-up list, clearing the system constant.

4. The method according to claim 3, wherein, the step of the application layer backing up application data under the application data directory of which the permission has been set to read-write comprises:

the application layer comparing the application data under the application data directory of which the permission has been set to read-write with application data backed up previously, and obtaining difference part application data under the application data directory;

the application layer backing up the difference part application data, and recording a backup time point of the difference part application data for a user to restore the application data as required by using the backup time point.

5. The method according to claim 4, wherein the method further comprises:

after the step of the application layer backing up application data under the application data directory of which the permission has been set to read-write is completed, performing a step of restoring the directory permission of the application data directory by using the directory permission backed up in the backed-up list.

6. The method according to claim 5, wherein, the step of restoring the directory permission of the application data directory comprises:

the application layer setting the application data directory into a system constant again;

the bottom layer finding the application data directory by scanning the system constant, and checking whether the found application data directory has existed in the backed-up list;

if the found application data directory has existed in the backed-up list, restoring the read-write permission of the application data directory to the directory permission backed up in the backed-up list; and after restoring the read-write permission of the application data directory to the directory permission backed up in the backed-up list, clearing the system constant.

7. The method according to claim 4, wherein, the step of performing restoration as required by using the backed-up application data comprises:

according to a restoration instruction, the application layer forcibly closing the application, and in accordance with a backup time point selected by the user, reading all application data backed up before the backup time point, and copying all the application data to the application data directory of which the permission has been set to read-write.

8. An apparatus for automatically backing up application data and performing restoration as required, comprising a memory containing instructions and a processor which is configured to execute the instructions in the memory to:

make an application layer set an application data directory of an application into a system constant, which is an area that is able to be read and written by both the application layer and a bottom layer, according to a backup instruction;

make the bottom layer acquire a directory permission of the application data directory by using the application data directory in the system constant;

make the bottom layer, which is configured with an initiation file so as to have root permission, set a permission of the application data directory to read-write; and make the application layer back up the application data under the application data directory of which the permission has been set to read-write, to perform restoration as required by using the backed-up application data hereafter.

9. The apparatus according to claim 8, wherein, the processor is further configured to:

make the application layer compare the application data under the application data directory of which the permission has been set to read-write with application data backed up previously, and obtain difference part application data under the application data directory;

make the application layer back up the difference part application data, and record a backup time point of the difference part application data for a user to restore the application data as required by using the backup time point.

10. The apparatus according to claim 9, wherein the processor is further configured to:

make the application layer forcibly close the application according to a restoration instruction, and in accordance with a backup time point selected by the user, read all application data backed up before the backup time point, and copy all the application data to the application data directory of which the permission has been set to read-write.

11. The method according to claim 2, wherein the method further comprises:

after acquiring the directory permission of the application data directory, backing up the application data directory and the directory permission to a backed-up list;

after backing up the application data directory and the directory permission to the backed-up list, clearing the system constant.

12. The method according to claim 11, wherein, the step of the application layer backing up application data under the application data directory of which the permission has been set to read-write comprises:

the application layer comparing the application data under the application data directory of which the permission has been set to read-write with application data backed up previously, and obtaining difference part application data under the application data directory;

the application layer backing up the difference part application data, and recording a backup time point of the difference part application data for a user to restore the application data as required by using the backup time point.

13. The method according to claim 12, wherein the method further comprises: after the step of the application layer backing up application data under the application data directory of which the permission has been set to read-write is completed, performing a step of restoring the directory permission of the application data directory by using the directory permission backed up in the backed-up list.

14. The method according to claim 13, wherein, the step of restoring the directory permission of the application data directory comprises:

the application layer setting the application data directory into a system constant again;

the bottom layer finding the application data directory by scanning the system constant, and checking whether the found application data directory has existed in the backed-up list;

if the found application data directory has existed in the backed-up list, restoring the read-write permission of the application data directory to the directory permission backed up in the backed-up list; and after restoring the read-write permission of the application data directory to the directory permission backed up in the backed-up list, clearing the system constant.

15. The method according to claim 12, wherein, the step of performing restoration as required by using the backed-up application data comprises:

according to a restoration instruction, the application layer forcibly closing the application, and in accordance with a backup time point selected by the user, reading all application data backed up before the backup time point, and copying all the application data to the application data directory of which the permission has been set to read-write.

16. The method according to claim 13, wherein, the step of performing restoration as required by using the backed-up application data comprises:

according to a restoration instruction, the application layer forcibly closing the application, and in accordance with a backup time point selected by the user, reading all application data backed up before the backup time point, and copying all the application data to the application data directory of which the permission has been set to read-write.

17. The method according to claim 14, wherein, the step of performing restoration as required by using the backed-up application data comprises:

according to a restoration instruction, the application layer forcibly closing the application, and in accordance with a backup time point selected by the user, reading all application data backed up before the backup time point, and copying all the application data to the application data directory of which the permission has been set to read-write.

18. The method according to claim 5, wherein, the step of performing restoration as required by using the backed-up application data comprises:

according to a restoration instruction, the application layer forcibly closing the application, and in accordance with a backup time point selected by the user, reading all application data backed up before the backup time point, and copying all the application data to the application data directory of which the permission has been set to read-write.

19. The method according to claim 6, wherein, the step of performing restoration as required by using the backed-up application data comprises:

according to a restoration instruction, the application layer forcibly closing the application, and in accordance with a backup time point selected by the user, reading all application data backed up before the backup time point, and copying all the application data to the application data directory of which the permission has been set to read-write.

* * * * *